United States Patent Office.

JOHN H. TUTTLE, OF EAST HAMPTON, MASSACHUSETTS.

Letters Patent No. 92,764, dated July 20, 1869.

IMPROVED PROCESS OF TREATING VULCANIZED RUBBER-THREAD WASTE.

The Schedule referred to in these Letters Patent and making part of the same.

*To all whom it may concern:*

Be it known that I, JOHN H. TUTTLE, of East Hampton, in the county of Hampshire, and State of Massachusetts, have invented a new and useful Application of Vulcanized Rubber-Thread Waste to the manufacture of moulded or other articles; and I do hereby declare the following to be a full and correct description of the same.

In the manufacture of vulcanized-rubber thread, a very large quantity of scraps and chippings necessarily accumulates, forming what is known as rubber-thread waste. This has heretofore been regarded as almost entirely useless, and has generally been burned in order to get it out of the way. Some little of it has occasionally been cut into strips and wound into balls for toys, and it has also been ground and used to reduce or adulterate the unvulcanized gum, by mixing a small percentage of the ground waste with the native article while undergoing preparation for manufacture. But these exceptional uses have failed to consume the large quantities of waste that accumulate in every considerable factory where rubber thread is the chief article produced.

The object of my invention is to utilize and give value to this refuse material; and It consists in the employment of the ground or pulverized waste alone, without any admixture of pure caoutchouc or gutta-percha, to form moulded or other articles of utility or ornament.

I take the waste and subject it to the action of grinding-rollers, which reduce it to a coarse, loose powder, of a greenish-brown color, and very resilient, resisting compression with great obstinacy.

This powder I introduce under pressure into moulds, and then subject the moulds to heat, when articles of the desired form and consistence are produced.

The hardness and elasticity of the articles produced depend upon the degree of heat and pressure to which the material is subjected. The greater the heat and pressure, the greater the hardness, and *vice versa,*

Having thus described my invention, or discovery,

What I claim, and desire to secure by Letters Patent, is—

The application of ground vulcanized rubber-thread waste, without the necessity of being mixed with pure rubber or gutta-percha, to the manufacture of moulded and other articles, by subjecting the said ground waste to pressure and heat as specified.

The above specification of my said invention signed and witnessed at Washington, this 25th day of June, A. D. 1869.

JOHN H. TUTTLE.

Witnesses:
A. C. BRADLEY,
CHAS. F. STANSBURY.